(12) United States Patent
Traiser et al.

(10) Patent No.: US 10,647,229 B2
(45) Date of Patent: May 12, 2020

(54) CRASH LOCKING DEVICE

(71) Applicant: Accuride International Gmbh, Diez (DE)

(72) Inventors: Reinhold Traiser, Bad Camberg (DE); Thomas Quirein, Diez (DE)

(73) Assignee: Accuride International GmbH, Diez (DE)

(*) Notice: Subject to any disclaimer, the term of this patent is extended or adjusted under 35 U.S.C. 154(b) by 0 days.

(21) Appl. No.: 15/773,193

(22) PCT Filed: Nov. 8, 2016

(86) PCT No.: PCT/EP2016/076979
§ 371 (c)(1),
(2) Date: May 3, 2018

(87) PCT Pub. No.: WO2017/081004
PCT Pub. Date: May 18, 2017

(65) Prior Publication Data
US 2018/0319297 A1 Nov. 8, 2018

(30) Foreign Application Priority Data
Nov. 9, 2015 (DE) .................... 20 2015 106 016 U

(51) Int. Cl.
 *B60N 2/02* (2006.01)
 *B60N 2/42* (2006.01)
 *B60N 2/07* (2006.01)
(52) U.S. Cl.
 CPC ............. *B60N 2/43* (2013.01); *B60N 2/0715* (2013.01); *B60N 2/0747* (2013.01)

(58) Field of Classification Search
 CPC ............. E05Y 2201/22; E05Y 2201/64; E05Y 2900/132; Y10S 224/924; A47F 1/12;
(Continued)

(56) References Cited

U.S. PATENT DOCUMENTS 1,271,812 A * 7/1918 Wagner ................ B61D 47/005
                                                   104/44
1,582,556 A * 4/1926 Stuck .................... A47B 88/493
                                                   312/334.11

(Continued)

FOREIGN PATENT DOCUMENTS

| DE | 2 325 292 A1 | 11/1974 |
|---|---|---|
| DE | 35 36 545 A1 | 4/1987 |

(Continued)

*Primary Examiner* — Kiran B Patel
(74) *Attorney, Agent, or Firm* — Faegre Drinker Biddle & Reath LLP

(57) ABSTRACT

Telescopic rail includes first rail and second rail supported against each other to be linearly slidable in relation to each other in an extending direction from a first position into a second position, and locking device. The locking device includes stop element on first rail, mass element held on second rail and movable in relation to second rail in the extending direction or against the extending direction, spring element resiliently pretensioning mass element with a spring force, and locking element. The spring force has a force direction in the extending direction or against the extending direction. Mass element is movable against the spring force from an idle position into a triggering position, and, through a movement of mass element against the spring force, locking element is movable from an unlocked position into a locking position such that locking element in the locking position can be brought into engagement with stop element.

15 Claims, 8 Drawing Sheets

(58) Field of Classification Search
CPC ......... A47F 7/285; A63C 9/005; A63H 19/30; A47B 2210/0059; B60R 22/201
See application file for complete search history.

(56) References Cited

U.S. PATENT DOCUMENTS

| | | | | |
|---|---|---|---|---|
| 3,589,778 | A * | 6/1971 | Olson | F16O 29/02 384/21 |
| 3,897,101 | A | 7/1975 | Hess | |
| 4,370,007 | A * | 1/1983 | Fler | A47B 88/493 312/333 |
| 4,423,914 | A * | 1/1984 | Vander Ley | A47B 88/493 312/333 |
| 4,441,772 | A * | 4/1984 | Fielding | A47B 88/57 312/330.1 |
| 4,549,773 | A * | 10/1985 | Papp | A47B 88/493 312/334.47 |
| 4,557,531 | A * | 12/1985 | Rock | A47B 88/487 384/18 |
| 4,560,212 | A * | 12/1985 | Papp | A47B 88/493 312/334.47 |
| 4,610,487 | A * | 9/1986 | Delmege | A47B 88/57 384/18 |
| 4,620,719 | A * | 11/1986 | Stritzl | A63O 9/005 280/633 |
| 4,880,341 | A * | 11/1989 | Van Den Pol | B61D 3/04 410/1 |
| 5,002,402 | A * | 3/1991 | Parvin | A47B 88/493 384/21 |
| 5,316,389 | A * | 5/1994 | Hoffman | A47B 88/493 384/18 |
| 5,411,333 | A * | 5/1995 | Hoffman | A47B 88/493 384/18 |
| 5,466,060 | A * | 11/1995 | Hoffman | A47B 88/493 312/334.11 |
| 5,472,272 | A * | 12/1995 | Hoffman | A47B 88/493 312/334.11 |
| 5,507,571 | A * | 4/1996 | Hoffman | A47B 88/493 312/334.16 |
| 5,551,775 | A * | 9/1996 | Parvin | A47B 88/493 312/334.11 |
| 5,632,541 | A * | 5/1997 | Uthoff | A47B 88/427 312/333 |
| 5,671,988 | A * | 9/1997 | O'Neill | A47B 88/467 312/333 |
| 5,775,780 | A | 7/1998 | Murphy et al. | |
| 5,871,265 | A * | 2/1999 | Stewart | A47B 88/493 312/333 |
| 6,238,031 | B1 * | 5/2001 | Weng | A47B 88/407 312/333 |
| 6,296,338 | B1 * | 10/2001 | Stijns | A47B 88/493 312/333 |
| 6,364,272 | B1 * | 4/2002 | Schuler | B60N 2/072 248/424 |
| 6,367,899 | B1 * | 4/2002 | Hwang | A47B 88/57 312/334.47 |
| 6,457,790 | B1 * | 10/2002 | Liang | A47B 88/493 312/333 |
| 6,516,575 | B2 * | 2/2003 | Haab | E05D 13/04 160/196.1 |
| 6,601,933 | B1 * | 8/2003 | Greenwald | H05K 7/1489 312/330.1 |
| 6,655,763 | B2 * | 12/2003 | Judge | H05K 7/1489 312/334.11 |
| 6,883,885 | B2 * | 4/2005 | Judge | H05K 7/1421 312/333 |
| 6,962,397 | B2 * | 11/2005 | Dobler | A47B 88/407 312/333 |
| 6,997,529 | B1 * | 2/2006 | Chen | A47B 88/493 312/334.44 |
| 7,101,081 | B2 * | 9/2006 | Chen | A47B 88/493 312/334.46 |
| 7,108,340 | B2 * | 9/2006 | Lai | A47B 88/57 312/333 |
| 7,357,468 | B2 * | 4/2008 | Hwang | A47B 88/49 312/333 |
| 7,404,611 | B1 * | 7/2008 | Que | A47B 88/493 312/333 |
| 7,413,269 | B2 * | 8/2008 | Chen | A47B 88/493 312/333 |
| 7,571,968 | B2 * | 8/2009 | Ji | A47B 88/493 312/333 |
| 7,604,307 | B2 * | 10/2009 | Greenwald | A47B 88/49 312/333 |
| 7,695,080 | B2 * | 4/2010 | Chen | A47B 88/427 312/333 |
| 7,708,357 | B2 * | 5/2010 | Cho | A47B 88/53 312/333 |
| 7,918,517 | B2 * | 4/2011 | Chen | A47B 88/57 312/334.46 |
| 8,147,011 | B2 * | 4/2012 | Chen | H05K 7/1489 312/333 |
| 8,186,779 | B2 * | 5/2012 | Chen | A47B 88/493 312/319.1 |
| 8,231,188 | B1 * | 7/2012 | Chen | A47B 88/57 312/333 |
| 8,240,789 | B2 * | 8/2012 | Chen | F16C 29/046 312/333 |
| 8,317,278 | B2 * | 11/2012 | Enos | A47B 88/493 312/333 |
| 8,366,217 | B1 * | 2/2013 | Chen | A47B 88/43 312/333 |
| 8,366,218 | B2 * | 2/2013 | Janzen | A47B 88/427 312/334.1 |
| 8,402,606 | B1 * | 3/2013 | Tsai | E05F 3/18 16/49 |
| 8,403,433 | B2 * | 3/2013 | Chen | A47B 88/43 312/333 |
| 8,474,924 | B2 * | 7/2013 | Hsu | H05K 7/1489 211/26 |
| 8,562,085 | B2 * | 10/2013 | Chen | A47B 88/493 312/333 |
| D695,599 | S * | 12/2013 | Rechberg | D8/377 |
| 8,622,492 | B2 * | 1/2014 | Chen | F16B 21/09 312/333 |
| 8,678,336 | B2 * | 3/2014 | Couasnon | B60N 2/0727 248/429 |
| 8,733,864 | B2 * | 5/2014 | Chen | A47B 88/493 312/333 |
| 8,919,897 | B2 * | 12/2014 | Chen | E05D 15/0686 312/334.44 |
| 9,144,173 | B2 * | 9/2015 | Chen | H05K 7/1489 |
| 9,279,280 | B1 * | 3/2016 | Chen | A47B 88/44 |
| 9,375,084 | B2 * | 6/2016 | Lachman | A47B 88/423 |
| 9,386,721 | B2 * | 7/2016 | Hsu | H05K 7/1489 |
| 9,498,061 | B2 * | 11/2016 | Liang | A47B 88/487 |
| 9,538,845 | B1 * | 1/2017 | Chen | A47B 88/49 |
| 9,557,782 | B2 * | 1/2017 | Hsu | G06F 1/182 |
| 9,642,279 | B2 * | 5/2017 | Chen | H05K 7/1489 |
| 9,709,091 | B2 * | 7/2017 | Chen | F16C 29/12 |
| 9,795,216 | B1 * | 10/2017 | Chen | A47B 88/46 |
| 9,854,909 | B1 * | 1/2018 | Chiu | A47B 88/487 |
| 9,861,200 | B2 * | 1/2018 | Lim | A47B 96/07 |
| 9,939,014 | B1 * | 4/2018 | Chiu | F16C 29/10 |
| 10,028,406 | B2 * | 7/2018 | Chen | H05K 7/183 |
| 10,047,791 | B2 * | 8/2018 | Chen | A47B 96/07 |
| 10,117,352 | B2 * | 10/2018 | Chen | F16O 29/002 |
| 10,165,858 | B1 * | 1/2019 | Chen | A47B 88/437 |
| 10,292,495 | B2 * | 5/2019 | Anderson | A47B 88/427 |
| 10,327,549 | B2 * | 6/2019 | Lachman | A47B 88/487 |
| 2001/0003407 | A1 * | 6/2001 | Fraccaro | A47B 88/493 312/333 |
| 2002/0089273 | A1 * | 7/2002 | Weng | A47B 88/487 312/334.1 |
| 2003/0141791 | A1 * | 7/2003 | Dubon | H05K 7/1421 312/333 |
| 2003/0209958 | A1 * | 11/2003 | Hwang | A47B 88/49 312/334.46 |

(56) References Cited

U.S. PATENT DOCUMENTS

| | | | |
|---|---|---|---|
| 2005/0074190 A1* | 4/2005 | Traiser | A47B 88/483 384/21 |
| 2006/0049731 A1* | 3/2006 | Choi | F25D 25/025 312/330.1 |
| 2006/0238082 A1* | 10/2006 | Heidemann | G07F 11/38 312/131 |
| 2006/0288529 A1* | 12/2006 | Chen | A47B 88/493 16/96 R |
| 2008/0224583 A1* | 9/2008 | Prenter | A47B 88/493 312/334.8 |
| 2009/0261698 A1* | 10/2009 | Cabal Velarde | A47B 88/43 312/334.8 |
| 2009/0293857 A1* | 12/2009 | Segers | F24C 15/16 126/19 R |
| 2010/0019641 A1* | 1/2010 | Laible | F25D 25/025 312/404 |
| 2014/0027600 A1 | 1/2014 | Kato et al. | |
| 2014/0318422 A1* | 10/2014 | Neuhaus | B60N 2/242 108/44 |
| 2014/0363107 A1* | 12/2014 | Egger | F16C 29/02 384/21 |
| 2017/0079429 A1* | 3/2017 | Willach | A47F 1/12 |
| 2019/0167000 A1* | 6/2019 | Storck | A47B 88/48 |

FOREIGN PATENT DOCUMENTS

| | | |
|---|---|---|
| DE | 102 01 092 A1 | 7/2003 |
| GB | 2 410 057 A | 7/2005 |
| JP | H06-48229 A | 2/1994 |

\* cited by examiner

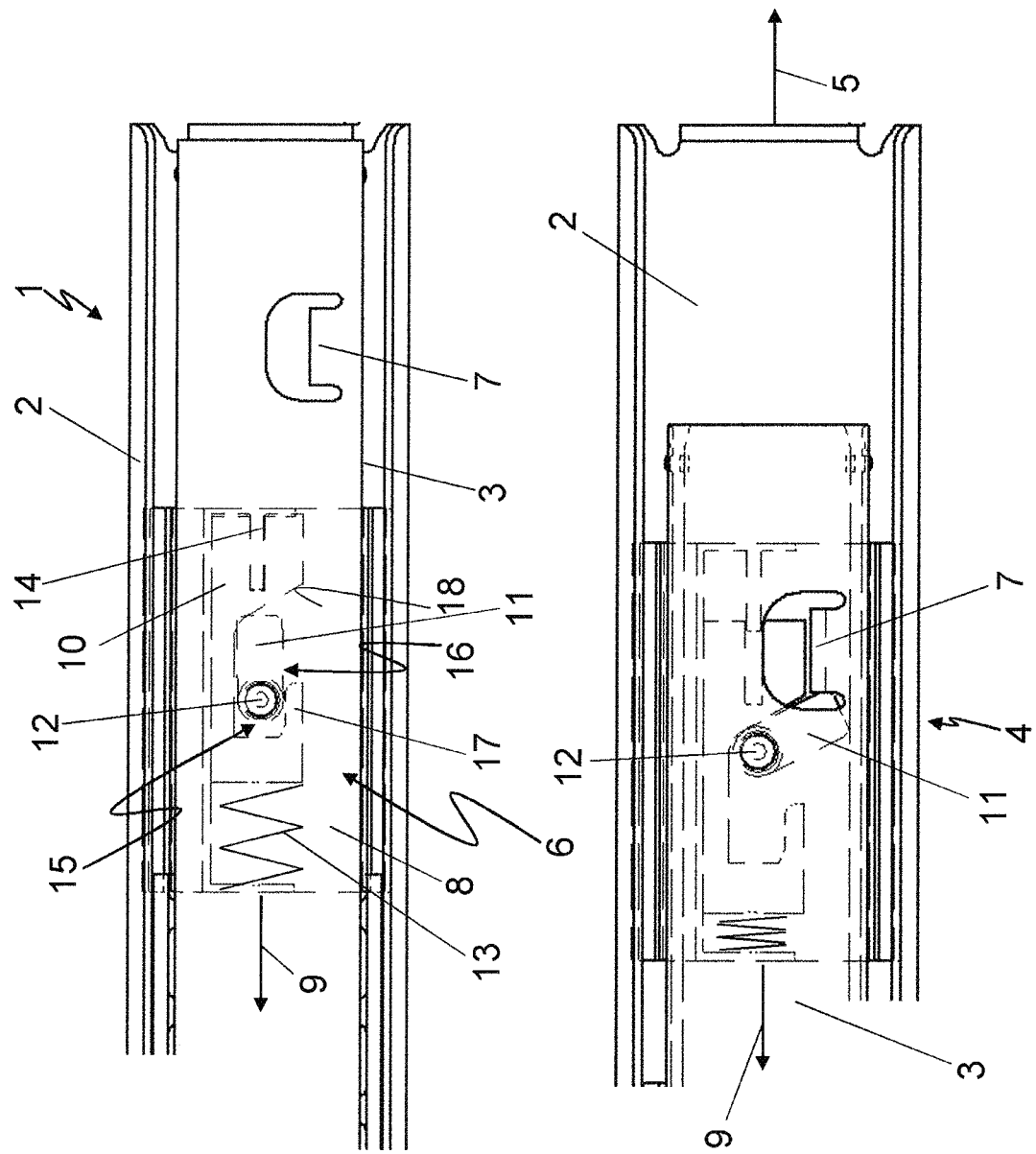

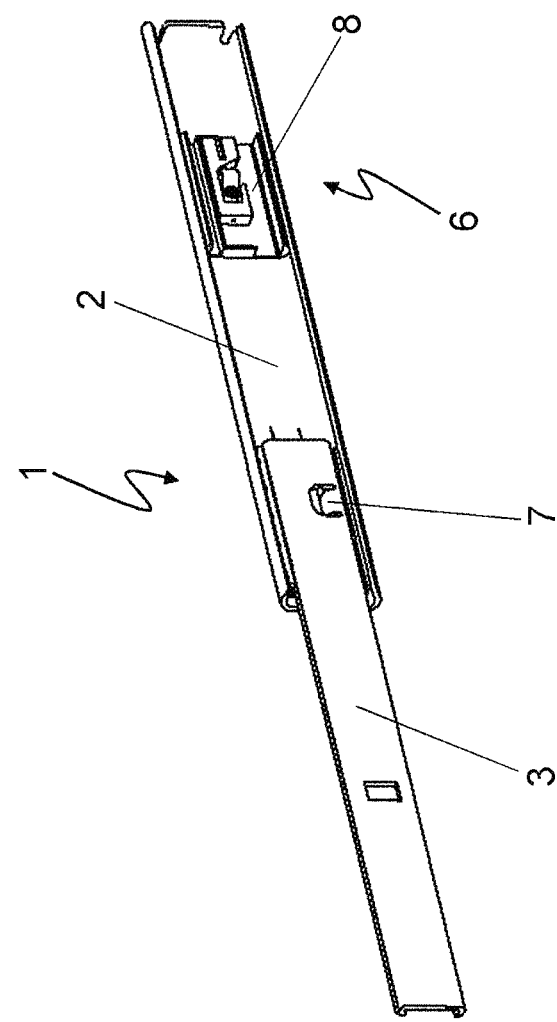

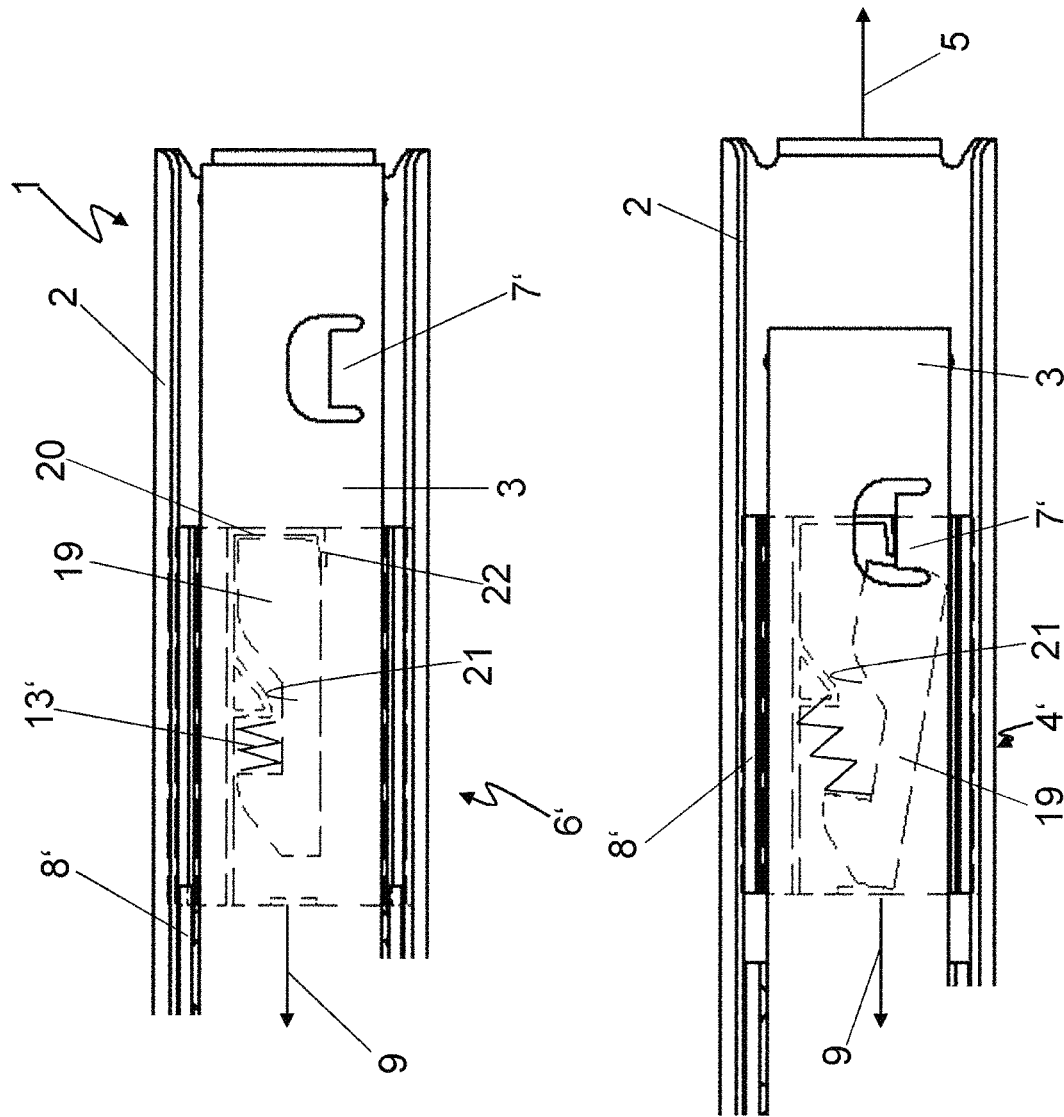

CRASH LOCKING DEVICE

CROSS REFERENCE TO RELATED APPLICATIONS

This application is a National Stage of International Application No. PCT/EP2016/076979 filed Nov. 8, 2016, which claims benefit of German Patent Application No. 20 2015 106 016.5 filed Nov. 9, 2015, each of which are herein incorporated by reference in their entirety.

The present invention relates to a telescopic rail with a first rail and a second rail, wherein the first rail and the second rail are supported against each other so as to be linearly slidable in relation to each other in an extending direction from a first position into a second position.

Such telescopic rails are known in various embodiments in order to connect two elements or sub-assemblies to each other such that they are linearly slidable in relation to each other. Terms that are used synonymously for a telescopic rail are telescopic rail guide, a telescopic slide or a telescopic support rail.

Such telescopic rails have a wide range of application, from furniture making, to household appliances and medical engineering, to equipping vehicles.

Apparatuses which facilitate operation and affect the normal operation of a telescopic rail are often provided on the rails. Examples of these are frictional brakes or cushioned end stops.

In the face of this, the object of the present invention is to provide a telescopic rail which inhibits incorrect operation or, in special situations, for example during a motor vehicle accident, prevents an actuation of the telescopic rail not intended by the user.

At least one of the above-named objects is achieved by a telescopic rail with a first rail and a second rail, wherein the first rail and the second rail are supported against each other so as to be linearly slidable in relation to each other in an extending direction from a first position into a second position, wherein the telescopic rail furthermore has a locking device, wherein the locking device comprises: a stop element on the first rail, a mass element held on the second rail and movable in relation to the second rail in the extending direction or against the extending direction, a spring element that resiliently pretensions the mass element with a spring force and a locking element, wherein the spring force has a force direction in the extending direction or against the extending direction, wherein the mass element is movable against the spring force from an idle position into a triggering position and wherein the locking element is movable, by a movement of the mass element against the spring force, from an unlocked position into a locking position such that in the locking position the locking element can be brought into engagement with the stop element.

The concept forming the basis of the invention is to detect, with the aid of the mass element, an acceleration of the second rail exceeding a particular threshold value. If the acceleration of the second rail lies above the threshold value, the mass element shifts in relation to the second rail and enables a movement of the locking element from an unlocked position into a locking position. The locking position is characterized in that in the locking position the locking element can be brought into engagement with the stop element of the first rail, with the result that a further extending movement of the first and of the second rail in relation to each other is effectively prevented. The unlocked position of the locking element on the other hand is characterized in that in this position the locking element and the stop element can be moved past each other during a sliding movement of the first and the second rail in relation to each other.

In an embodiment, precisely one stop element is provided on the first rail, with the result that the first and second rails can be locked precisely in one position relative to each other.

In an embodiment, the locking device according to the invention serves exclusively as an emergency locking device for the telescopic rail.

In a further embodiment, the telescopic rail additionally has an apparatus for braking, cushioning or catching an extending movement between the first rail and the second rail under normal operating conditions. Normal operating conditions are characterized in that the maximum acceleration occurring in the longitudinal direction is smaller than a threshold value for the acceleration, from which the mass element of the locking device according to the invention moves out of the idle position into the triggering position. Such additional apparatuses for braking, cushioning or catching an extending movement are based in particular on a force or friction fit between in each case an element on the first rail and an element on the second rail. The locking device according to the invention only comes into use in such an embodiment when, because of the forces being exerted, the additional apparatus for braking, cushioning or catching the extending movement fails or has a reduced effectiveness.

Such an embodiment has the advantage in particular that it makes it possible to dimension the apparatus for braking, cushioning or catching the extending movement exclusively for operation under normal operating conditions, whereas the locking device according to the invention, at least in one embodiment, is dimensioned for emergency conditions because of the form fit provided by it. In such an embodiment the locking device according to the invention additionally need not provide locking under normal operating conditions.

Compared with conventional apparatuses for braking, cushioning or catching an extending movement, in particular by a force or friction fit between in each case an element on the first rail and an element on the second rail, the locking device according to the invention, at least in one embodiment, has the advantage that it makes do with a reduced number of components and has a smaller installation size.

The present invention is suitable in principle for all possible types of telescopic rails. A telescopic rail within the meaning of the present application comprises two or more rail elements supported so as to be displaceable in relation to each other, wherein in the extended state the telescopic rail has a length which substantially exceeds that of the longest rail element. In the case of a so-called partial extension the telescopic rail can be extended to a length which is shorter than twice the length of the longest rail element. In the case of a full extension the telescopic rail can be extended to a length which is approximately equal to twice the length of the longest rail element. To perform a full extension, at least three rail elements displaceable in relation to each other are required. An over-extension is referred to, on the other hand, when the telescopic rail actually allows itself to be extended to a length which is greater than twice the length of the longest rail element.

The support of the rail elements in relation to each other can be effected via slide bearings, roller or roll bearings or via ball bearings. In the case of more demanding applications, as a rule, ball bearings are used as these have a high load capacity and good displacement properties.

In order to prevent a further sliding movement of the first rail and the second rail in relation to each other, according to the invention a form fit between the stop element and the locking element is provided, wherein this form fit is only effected when the second rail has experienced an acceleration which exceeds the threshold value. For this, it is necessary for the stop element to be provided on the first rail and for the locking element, together with the mass element, to be provided on the second rail. The locking element and the stop element must be arranged such that they engage with each other in the locking position of the locking element and can be moved past each other in the unlocked position of the locking element.

In an embodiment of the invention, the stop element is a protrusion on the first rail. In a further embodiment, the stop element is designed as a stamped/bent part, the contour of which is introduced into the material of the first rail, preferably a sheet of metal, with the aid of a stamping or cutting process first, while in a second step the stop element is bent in relation to the wall of the rail.

In an embodiment of the invention, the first and/or the second rail are manufactured from a sheet of metal by bending.

In a further embodiment of the invention, the mass element and/or the locking element are held in a housing which is connected to the second rail. The second rail can have markers formed by a stamping/bending process for exact positioning of the housing and thus of the mass element and the locking element.

In an embodiment of the invention, the housing is a bent part made of sheet metal. In an embodiment, this bent part can be installed on the second rail toollessly, for example by being clipped into the second rail.

The locking device according to the invention is intended to prevent an unimpeded sliding movement between the first and the second rail from occurring, because of the mass inertia of the second rail, when an acceleration above a particular threshold value arises.

The mass element can therefore detect the acceleration of the second rail in the extending direction or against the extending direction. For this, it is necessary for the mass element to be held on the second rail, such that it can perform a movement in the extending direction or against the extending direction. However, it suffices if the direction of the movement of the mass element has a vector component which points in the extending direction or against the extending direction.

Consequently, the spring force must also have a force direction in the extending direction or against the extending direction. Here too, it suffices if one of the vector components of the spring force points in the extending direction or against the extending direction. The spring force acts on the mass element such that it pretensions the mass element in the idle position, with the result that an acceleration of the second rail has the result that the mass element is deflected against the spring force. The choice of the mass of the mass element and the spring force as well as the geometry of their arrangement and their degrees of freedom of movement determines the threshold value from which the mass element is deflected against the spring force out of the idle position into the triggering position.

In an embodiment of the present invention, the quotient of the spring force of the spring element in the extending direction or against the extending direction and of the mass of the mass element is equal to 1 g or more, preferably equal to 2 g or more and particularly preferably equal to 5 g or more, wherein g is the gravitational acceleration where $g=9.8$ m/s$^2$. Such a quotient of the named parameters is suitable in particular for use in motor vehicles, whereby the locking device is prevented from triggering in normal operating situations, but a reliable triggering under accident conditions is guaranteed.

In an embodiment of the invention, the locking element is held on the second rail so as to be movable in a direction substantially perpendicular to the extending direction. Within the meaning of the present application, "in a direction perpendicular to the extending direction" here also means that the movement of the locking element must have at least one vector component in this direction perpendicular to the extending direction. This movement in the direction substantially perpendicular to the extending direction makes it possible for the locking element and the stop element to be able to be moved past each other in the case of normal operation, whereas a form-fitting engagement between the two elements is made possible in the case of a triggering.

In an embodiment of the invention, the mass element and/or the locking element are designed such that they return to their idle position or unlocked position again, driven for example by a spring force, after a form-fitting engagement between the locking element and the stop element has ended.

In an embodiment of the invention, the mass element and the locking element are designed as one part, wherein the mass element with the locking element is held on the second rail so as to be movable from the unlocked position into the locking position. In such an embodiment the functions of the mass element and of the locking element are undertaken by a single component. This can be constructed as one piece or also from several parts rigidly connected to each other. Such an embodiment has the advantage that it makes do with only a single component in order to provide the functions of the mass element and of the locking element. However, this presupposes that this one-part component then has to be held on the second rail so as to be movable both in the extending direction or against the extending direction and in a direction substantially perpendicular thereto in order to undertake the function of the locking element.

For this, in an embodiment of the invention, the mass element with the locking element is held on the second rail so as to be pivotable from the unlocked position into the locking position.

In an embodiment with a one-part design of the mass element and of the locking element, provided on the second rail is a holding section which, in the idle position, prevents the mass element with the locking element from moving from the unlocked position into the locking position, wherein the holding section is designed such that, in the triggering position of the mass element, it releases the mass element with the locking element to move from the unlocked position into the locking position.

In such an embodiment, when an acceleration of the second rail exceeds a threshold value predefined by the mass of the mass element and the spring force of the spring in the extending direction, the mass element firstly performs a movement in the extending direction or against the extending direction and then, when this movement has had the result that the holding section has released the mass element, performs a movement in a direction substantially perpendicular to the extending direction.

In an alternative embodiment of the invention, the mass element with the locking element is supported against the second rail so as to be pivotable about an axis of rotation, wherein the spring element pretensions the mass element with the locking element in a first direction of rotation against a first rotary stop arranged on the second rail, wherein the first rotary stop defines the idle position of the mass element and wherein the axis of rotation is arranged outside the centre of mass.

In the previously described embodiment, with a one-part implementation of mass element and locking element, the mass element with the locking element, in the triggered case, firstly performs a translational movement in or against the extending direction in order then to perform a translational or pivoting movement in a direction perpendicular to the extending direction. In the now-described alternative embodiment of the invention, the mass element with the locking element is supported against the second rail so as to be pivotable only about one axis of rotation, wherein the pivoting movement has the result that the mass element performs a movement the direction of which is the superposition of a movement parallel to the extending direction or an opposite parallel movement and a movement substantially perpendicular to the extending direction.

In such an embodiment, in particular leg springs, coil springs or torsion springs which directly produce a pretensioning of the mass element about the axis of rotation towards the first rotary stop are suitable as spring element.

In an embodiment of the invention, the mass element with the locking element has a geometric design such that in the idle position it has a first maximum extent in a direction perpendicular to the extending direction and in the triggering position it has a second maximum extent in the direction perpendicular to the extending direction, wherein the first maximum extent in the direction perpendicular to the extending direction is smaller than the second maximum extent in the direction perpendicular to the extending direction and wherein the maximum extents are measured between a plane spanned by the extending direction and the axis of rotation and an edge of the mass element.

In an embodiment of the invention, a mass element designed in such a way has a substantially triangular cross section in a plane perpendicular to the axis of rotation.

In a further embodiment of the invention, a second rotary stop is provided on the second rail, wherein in the triggering position the mass element engages with the second rotary stop.

This second rotary stop then absorbs the torque introduced into the mass element by the form fit between the stop element and the mass element with the locking element.

In an alternative embodiment of the invention, the mass element and the locking element are formed in two parts, wherein the mass element is designed such that it is movable against the spring force from the idle position into the triggering position, wherein in the idle position a section of the mass element prevents the locking element from moving from the unlocked position into the locking position and wherein in the triggering position the locking element is movable from the unlocked position into the locking position. In an embodiment of this variant of the invention, the locking element is held on the second rail so as to be pivotable about an axis of rotation, with the result that the locking element is pivotable from the unlocked position into the locking position.

It is expedient if the mass element is additionally designed such that it drives a pivoting movement of the locking element in the case of a movement from the idle position into the triggering position.

For this, in an embodiment, the mass element has a lead-in bevel, wherein the mass element and the locking element are arranged such that, in the case of a movement of the mass element from the idle position into the triggering position, the lead-in bevel engages with the locking element and pivots the latter from the unlocked position into the locking position.

At least one of the above-named objects is also achieved by an article with a telescopic rail in one of the embodiments described previously as according to the invention, wherein an element which is movable in relation to the article with the aid of the telescopic rail is installed on the telescopic rail.

Such an article can be, for example, an item of furniture, wherein in an embodiment the element which is movable in relation to the item of furniture is then a drawer.

In the case of articles which are typically stationary, i.e. are not moved or displaced during their use, it is recommended to connect the first rail to the article, with the result that the acceleration triggering the locking is brought about by the extending movement of the telescopic rail itself. In this way, a locking of the telescopic rail can be effected if the second rail is moved too vigorously, i.e. with too high an acceleration.

Whether, in such an embodiment, the mass element can be moved from the idle position into the triggering position in the extending direction or against the extending direction depends on whether a locking is to be effected when the second rail is pushed in or pulled out in relation to the first rail.

In an alternative embodiment of the invention, the article on which the telescopic rail is installed is a movable article, i.e. an article which is moved or displaced in normal operation. Embodiments of such a movable article are, in particular, vehicles, such as land vehicles, watercraft or aircraft. In such an embodiment of the invention, it is expedient if the second rail is secured to the movable article, whereas an element which is longitudinally slidable in relation to the movable article is installed on the first rail.

In this way the mass element is deflected or moved in relation to the second rail when the second rail experiences, at the same time as the movable article, an acceleration which exceeds the threshold value defined by the mass element and the spring element. In this case a triggering and a locking of the telescopic rail are effected.

It is expedient in particular if, in the case of a vehicle, the mass element is movable in a longitudinal direction of the vehicle, wherein the longitudinal direction is given by the direction of forwards or backwards movement of the vehicle typically to be expected.

In movable articles and vehicles, two alternative embodiments are also conceivable, namely embodiments in which the mass element is movable from the idle position into the triggering position against the forwards direction of the vehicle and those embodiments in which the mass element is movable from the idle position into the triggering position in the forwards direction of the vehicle.

Further advantages, features and possible applications of the present invention will become clear with reference to the following description of embodiments thereof as well as the associated figures.

FIG. 1 shows a partially transparent side view of a first embodiment of the telescopic rail according to the invention with a mass element in the idle position.

FIG. 2 shows a partially transparent side view of the telescopic rail from FIG. 1 with the mass element in the triggering position.

FIG. 3 shows a perspective view diagonally from above onto the telescopic rail from FIGS. 1 and 2.

FIG. 4 shows a partially transparent side view of an alternative embodiment of the telescopic rail according to the invention with a mass element in the idle position.

FIG. 5 shows a partially transparent side view of the telescopic rail from FIG. 4 with the mass element in the triggering position.

FIG. 6a shows a side view of an open position of an embodiment of the telescopic rail according to the invention with a mass element in the idle position. FIGS. 6b and 6c show a side view and a top view along axis A of a closed position of the telescopic rail from FIG. 6a, wherein the mass element is in the idle position, too. Just the apparatus for braking is active. In addition, FIG. 6c shows an enlargement of the apparatus. In contrast, FIG. 6d shows a side view of the embodiment of the telescopic rail from FIG. 6a in a closed position but after a crash, wherein the mass element is in the triggering position.

Figure 7:
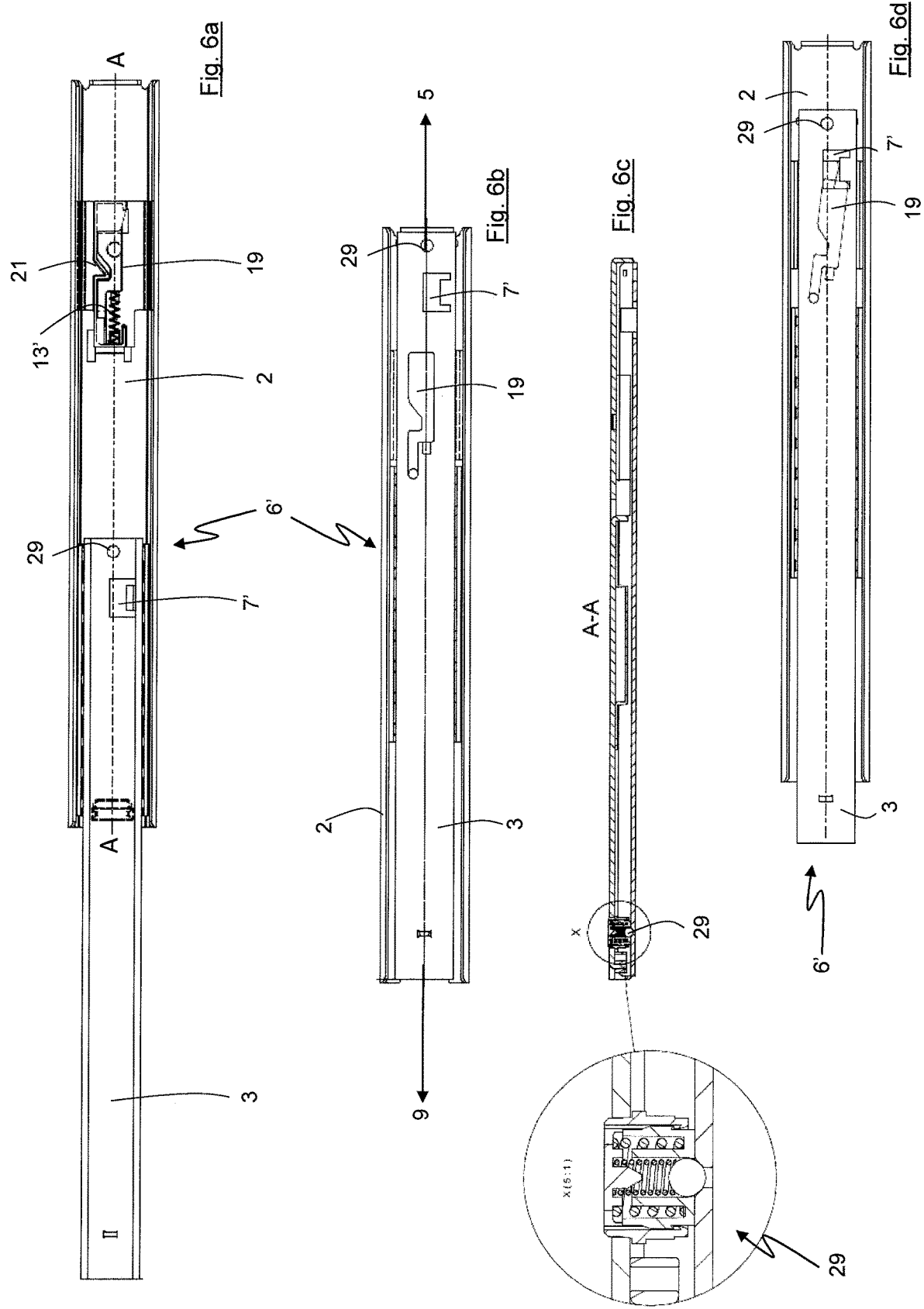

FIG. 7 shows a partially transparent side view of a further embodiment of the telescopic rail according to the invention with a mass element in the idle position.

Figure 8:
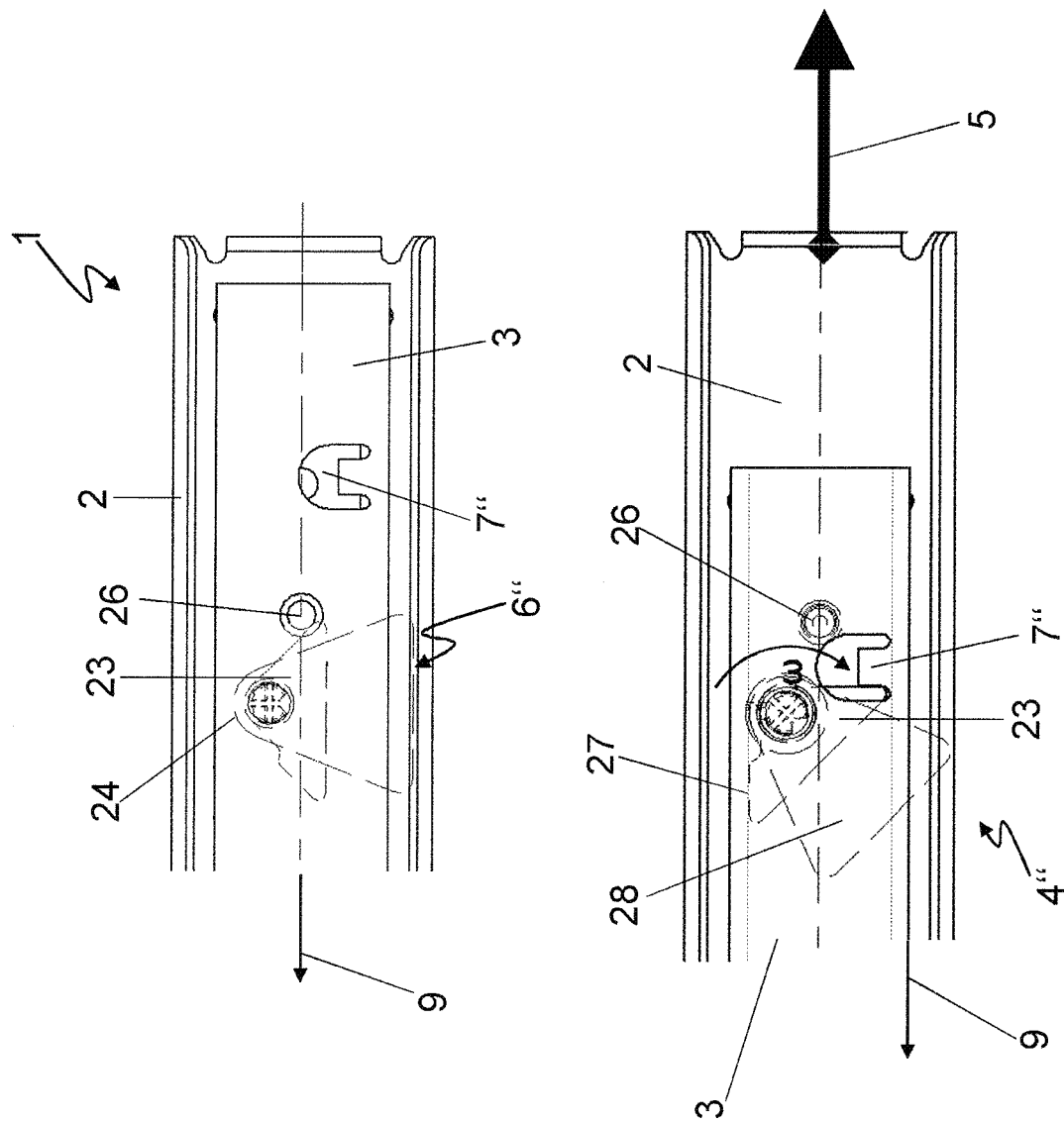

FIG. 8 shows a partially transparent side view of the telescopic rail from FIG. 7 with the mass element in the triggering position.

FIGS. 9A and 9B show perspective views from above of the telescopic rail from FIGS. 7 and 8.

Figure 9:
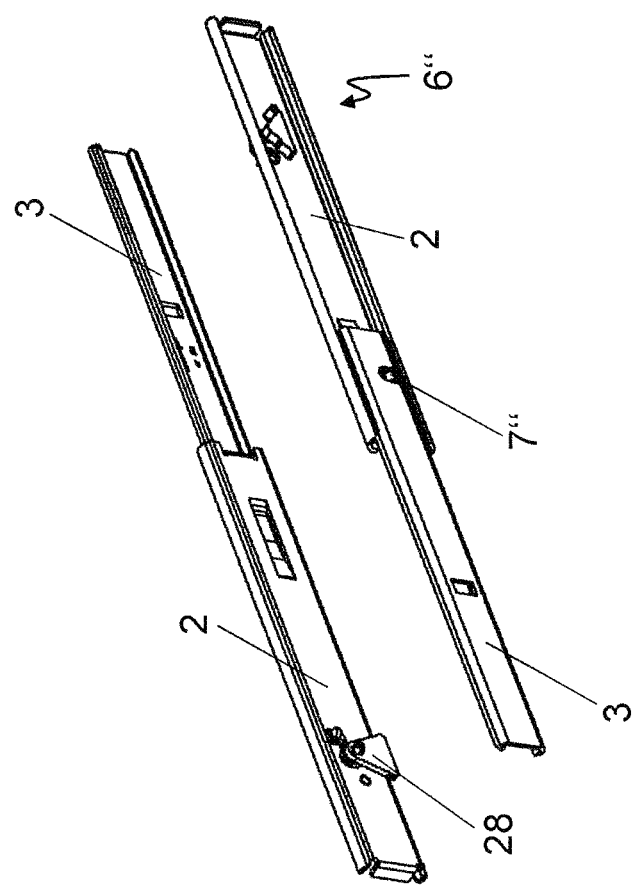
Figure 10:
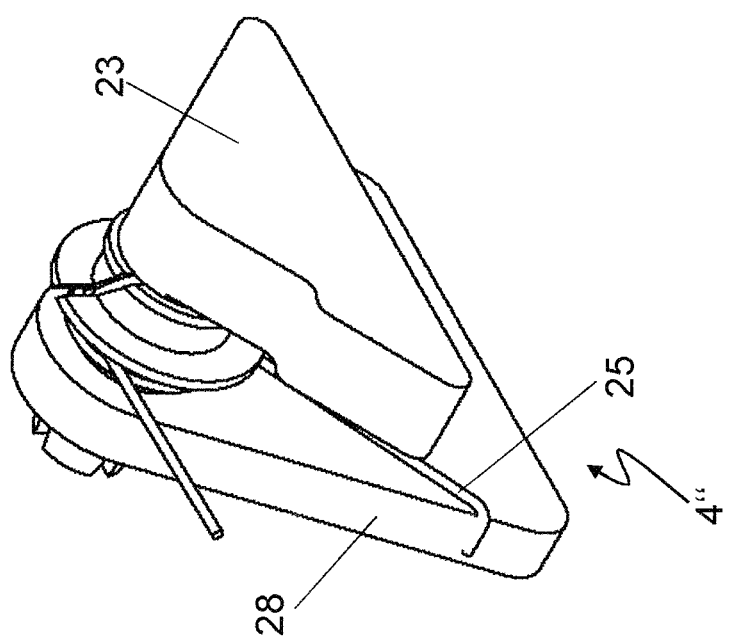

FIG. 10 shows an enlarged perspective view of the mass element of the telescopic rail from FIGS. 7 to 9.

Identical elements are given the same reference numbers in the figures.

In the embodiments of the invention discussed below, the telescopic rail 1 in each case is constructed from two rails, namely an outer rail 2 and an inner rail 3. The outer rail 2 forms the second rail within the meaning of the present application and the inner rail 3 forms the first rail.

In the side views of FIGS. 1, 2, 4, 5, 7 and 8, the inner rail 3 is represented partially transparent, in order to enable a view of the outer rail 2 and the locking device 4 provided on it.

For all embodiments represented, it is assumed that the outer rail 2 is installed on a movable article, namely on a motor vehicle. It then forms the stationary element of the telescopic rail 1 in this sense. The inner rail 3 is thus movable not only relatively in relation to the outer rail, but also in relation to the actual motor vehicle. Longitudinally slidable elements can then be installed on the inner rail 3.

In addition, for all embodiments shown here, it is assumed that this one locking device is provided to prevent an extension as a result of an accident to the motor vehicle (crash) into which the telescopic rail 1 is built. In the case of a rear-end collision, the locking device prevents the longitudinally slidable element from advancing, and possibly injuring a passenger, due to the acceleration which the outer rail experiences together with the vehicle.

In the case of such a rear-end collision, high acceleration forces occur in the forwards direction of the vehicle. This direction of acceleration is indicated with the arrow 5 in FIGS. 2, 5 and 8.

The three embodiments represented here differ not in respect of the basic structure of the rails 2, 3, but in respect of the structure of the locking device 4. The locking device 4 is in each case composed of a part 6, 6', 6" provided on the outer rail 2 with the mass element and the locking element and a stop element in the form of a locking tab 7, 7', 7".

In all embodiments shown, the locking tab 7, 7', 7", as locking element within the meaning of the present application, is stamped into the inner rail 3. As can be seen from FIGS. 3 and 6, the locking devices of the first two embodiments are arranged in housings 8, 8' connected to the outer rail 2, which provide a sliding block guide for the mass element or the locking element. The third embodiment according to FIGS. 7 to 10 on the other hand makes do without a dedicated housing, rather all elements are secured or arranged directly on the outer rail 2.

The first embodiment to be considered here according to FIGS. 1 to 3 is an embodiment in which the mass element and the locking element are designed in two parts. Here a moulded part 10 arranged so as to be movable in the extending direction 9 forms the mass element within the meaning of the present application and a pivotable locking lever 11 forms the locking element within the meaning of the present application. The locking lever 11 is supported pivotably on a pin 12 which forms an axis of rotation within the meaning of the present application. The mass element 10 is pretensioned against the extending direction 9 into an idle position with the aid of a compression spring 13. This idle position is shown in FIG. 1. The housing 8 has a guide 14 which enables a linear translational movement of the mass element 10 in the extending direction 9 and against the spring force of the spring 13, while preventing a movement in a direction perpendicular to the extending direction 9.

The mass element 10 is slidable against the spring force of the spring 13 from the idle position shown in FIG. 1 into the triggering position shown in FIG. 2. The locking lever 11 is pivotable from an unlocked position, in which the locking lever extends substantially parallel to the extending direction 9, into a locking position, in which the locking lever 11 extends substantially perpendicular to the extending direction 9. While the unlocked position is shown in FIG. 1, FIG. 2 shows the locking position. It is obvious from the consideration of FIG. 2 that the locking lever 11 in the locking position extends in a direction perpendicular to the extending direction 9 so far that it can be brought into engagement with the locking tab 7 on the inner rail or, when the inner rail moves a bit further, i.e. an extension takes place, engages with the locking tab 7.

On the other hand, when it is in the unlocked position (FIG. 1), the locking lever 11 has an extent in a direction perpendicular to the extending direction 9 which is dimensioned such that the locking tab 7 of the inner rail can be moved past both the mass element 10 and the locking lever 11 without engagement.

The mass element 10 has a recess 15, which is dimensioned and arranged such that, in the idle position of the mass element 10, the locking lever 11 in its unlocked position is completely held in this recess 15. The recess 15 additionally has an opening 16, through which the locking lever 11 is pivotable out of the recess 15 from the unlocked into the locking position. The mass element 10 additionally has a holding section 17, which, in the idle position of the mass element 10, holds the locking lever 11 in the unlocked position.

Furthermore, the mass element has a lead-in bevel 18. If the mass element 10 now moves against the spring force of the spring 13 from the idle position into the triggering position (i.e. from the position shown in FIG. 1 into the position shown in FIG. 2), then the mass element 10 engages with the locking lever 11 and the lead-in bevel 18 pivots the locking lever 11 from the unlocked position into the locking position. The latter is achieved when the mass element has reached the triggering position, as shown in FIG. 2.

It is now essential for the functionality of the locking device 4 that the mass of the mass element 10 and the spring force of the spring 13 are chosen such that in a normal operating situation they leave the mass element 10 in the idle position. Only when the acceleration of the mass element 10 exceeds a particular threshold value may the mass element 10 move from the idle position into the triggering position. In the embodiment represented, the spring force of the spring 13 and the mass of the mass element 10 are chosen such that a triggering, i.e. a locking, is only effected above an acceleration of 2 g. Such high accelerations as a rule only occur in motor vehicles when there is an accident.

The distance between the locking tab 7 and the locking lever 11 in the completely pushed-in state on the telescopic rail 1 (see FIG. 1) is additionally chosen such that in the case of a triggering event the time span within which a pivoting of the locking lever 11 from the unlocked into the locking position is effected is shorter than the length of time which the locking tab on the inner rail needs to move from the first position, which is shown in FIG. 1, into engagement with the locking lever 11.

Figure 6:
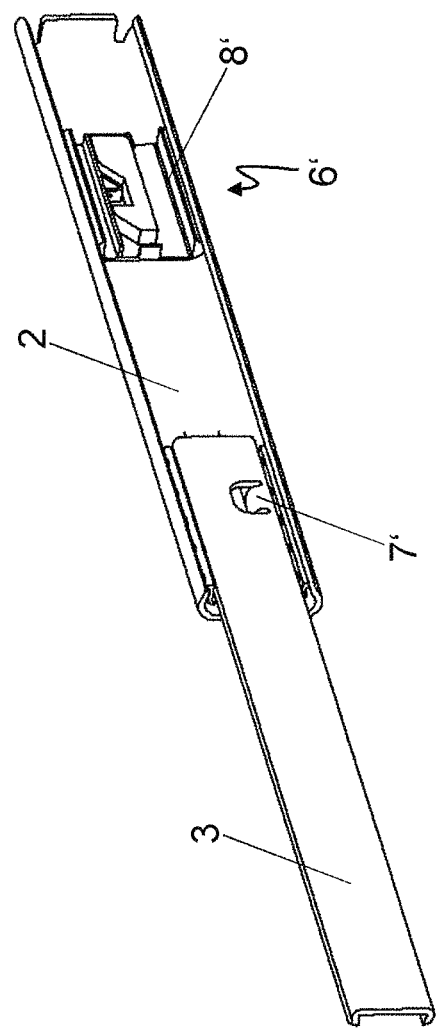
FIG. 6 shows a perspective view diagonally from above onto the telescopic rail from FIGS. 4 and 5.

An alternative embodiment of the invention which is now described according to FIGS. 4 to 6 makes do with only one moulded part 19, which combines the mass element and the locking element within the meaning of the present application with each other as one part and, in the embodiment shown, even as one piece. This moulded part 19 is held on the housing 8' such that firstly it can perform a linear translational movement against the spring force of the tension spring 13', and then, in a second step, an end 20 performs a pivoting movement in a direction perpendicular to the extending direction 9. In order to make this possible the housing has a sliding block guide consisting of a lead-in bevel 21 and a holding section 22. The holding section 22 ensures that in the idle position (see FIG. 4) the moulded part 19 can only perform a translational movement in the extending direction 9, and only when the holding section 22, through the translational movement of the moulded part 19, releases the latter can the moulded part 19 perform the pivoting movement. The pivoting movement is additionally guided by a lead-in bevel 21.

While FIG. 4 shows the idle position of the moulded part 19 and thus the unlocked position, FIG. 5 shows the triggering position and thus the locking position of the moulded part 19.

In this embodiment too, the tensile force of the spring 13' and the mass of the mass element 19 are again dimensioned such that a triggering, i.e. a movement of the mass element 19 from the idle position into the triggering position, is only effected above an acceleration of 2 g.

While, in the embodiment according to FIGS. 4 to 6, the moulded part 19, as mass element and locking element within the meaning of the present application, performs both a translational movement in the extending direction and a pivoting movement in a direction perpendicular to the extending direction, in order that it can be brought into engagement with the locking tab 7', the embodiment according to FIGS. 7 to 10 dispenses with a translational movement and reduces all movement of the mass element 23 to a pivoting movement.

The moulded part 23, which, in this embodiment too, in turn forms the mass element and the locking element as one piece, is supported so as to be pivotable about an axis of rotation 24. The moulded part 23 is resiliently pretensioned into its idle position with the aid of a leg spring 25 shown in FIG. 10. This idle position is defined by a retaining pin 26, which is connected to the outer rail 2. In the idle position the moulded part 23 is engaged with the retaining pin 26 and is held in this position by the leg spring 25.

It is essential for the functionality of the locking mechanism based on a pivoting movement of the moulded part 23 that the moulded part 23 has a design such that it is dimensioned in the idle position shown in FIG. 7 in a direction perpendicular to the extending direction 9 such that the locking tab 7" on the inner rail 3 can be moved past the moulded part 23. In contrast, the moulded part 23 in its triggering position, which at the same time also forms the locking position (see FIG. 8), has an extent in the direction perpendicular to the extending direction 9 which is so large that in the locking position the moulded part 23 can be brought into engagement with the locking tab 7".

While the retaining pin 26 forms a first rotary stop within the meaning of the present application, a second rotary stop 27 is additionally provided which forms a stop for the moulded part 23 in the triggering position or the locked position.

It is furthermore essential for the functionality of the embodiment according to FIGS. 7 to 10 that the moulded part 23 is hinged to the outer rail such that its axis of rotation is located outside the centre of mass of the moulded part 23. In this way all accelerations affecting the mass element 23 in the extending direction result in a torque which acts on the moulded part 23 and brings about a pivoting movement from the idle position (FIG. 7) into the triggering position (FIG. 8).

The embodiment according to FIGS. 7 to 10 also implements the basic concept of the present invention, in which an inert mass of the mass element 23 results in a movement at least with one movement component in the direction of the extending direction 9, which then additionally entails a movement of the locking element likewise formed by the moulded part 23 in a direction perpendicular to the extending direction 9. In this embodiment the movement in a direction perpendicular to the extending direction 9 is likewise a movement component of the pivoting movement of the moulded part 23 about the axis of rotation 24.

As, in the embodiment shown, the mass of the moulded part 23 is insufficient to generate the necessary torques, as shown in FIG. 9 another, second mass element 28 is provided on the same axis of rotation 24 on the rear side of the outer rail 2. This mass element 28 is likewise connected to the axis of rotation outside its centre of mass, with the result that the mass of this mass element 28 also exerts an additional torque on the axis of rotation 24 and thus on the moulded part 23.

In the embodiment shown the mass element 23, which also serves as locking element, has substantially the shape of an equilateral triangle in order to satisfy the geometric conditions for the mass element, as locking element, having both an unlocked position and a locking position.

For the purposes of original disclosure, it is pointed out that all features, as are revealed to a person skilled in the art from the present description, the drawings and the claims, even if they have been described specifically only in connection with particular further features, can be combined both individually and in any combinations with others of the features or feature groups disclosed here, unless this has been explicitly excluded or technical circumstances make such combinations impossible or meaningless. The comprehensive, explicit representation of all conceivable combinations of features is dispensed with here only for the sake of the brevity and readability of the description.

While the invention has been represented and described in detail in the drawings and the preceding description, this representation and description is merely exemplary and is not to be considered as limiting the scope of protection as defined by the claims. The invention is not limited to the disclosed embodiments.

Modifications of the disclosed embodiments are obvious to a person skilled in the art from the drawings, the description and the attached claims. In the claims the verb "to have" does not exclude other elements or steps, and the indefinite article "a" or "an" does not exclude a plural. The mere fact that particular features are claimed in different claims does not exclude a combination thereof. Reference numbers in the claims are not to be considered as limiting the scope of protection.

LIST OF REFERENCE NUMBERS 1 telescopic rail
2 outer rail
3 inner rail
4 locking device
7, 7', 7" locking tab
8, 8' housing
9 extending direction
10, 19, 23 mass element
11 locking lever
12 pin
13, 13' spring
14 guide
15 recess
16 opening
17, 22 holding section
18, 21 lead-in bevel
20 end of the mass element 19
24 axis of rotation
25 leg spring
26 retaining pin
27 rotary stop
28 additional mass element
29 apparatus for braking, cushioning or catching

The invention claimed is:

1. A telescopic rail comprising
a first rail and,
a second rail, wherein the first rail and the second rail are supported against each other so as to be linearly slidable in relation to each other in an extending direction from a first position into a second position,
wherein the telescopic rail furthermore has a locking device, wherein the locking device comprises
a stop element on the first rail,
a mass element held on the second rail and movable in relation to the second rail in the extending direction or against the extending direction,
a spring element resiliently pretensioning the mass element with a spring force, and
a locking element,
wherein the spring force has a force direction in the extending direction or against the extending direction,
wherein the mass element is movable against the spring force from an idle position into a triggering position, and
wherein through a movement of the mass element against the spring force the locking element is movable from an unlocked position into a locking position such that the locking element in the locking position can be brought into engagement with the stop element.

2. The telescopic rail according to claim 1, wherein in addition to the locking device the telescopic rail has an apparatus for braking, cushioning or catching an extending movement between the first rail and the second rail.

3. The telescopic rail according to claim 1, wherein the locking element is arranged on the second rail so as to be movable in a direction perpendicular to the extending direction from the unlocked position into the locking position.

4. The telescopic rail according to claim 1, wherein the mass element and the locking element are designed as one part, wherein the mass element with the locking element is held on the second rail so as to be movable from the unlocked position into the locking position.

5. The telescopic rail according to claim 4, wherein the mass element with the locking element is held on the second rail so as to be pivotable from the unlocked position into the locking position.

6. The telescopic rail according to claim 4, wherein provided on the second rail is a holding section which, in the idle position, prevents the mass element with the locking element from moving from the unlocked position into the locking position, wherein the holding section is designed such that, in the triggering position of the mass element, it releases the mass element with the locking element to move from the unlocked position into the locking position.

7. The telescopic rail according to claim 4, wherein the mass element with the locking element is supported against the second rail so as to be pivotable about an axis of rotation, wherein the spring element pretensions the mass element with the locking element in a first direction of rotation against a first rotary stop arranged on the second rail, wherein the first rotary stop defines the idle position of the mass element and wherein the axis of rotation is arranged outside a centre of mass of the mass element.

8. The telescopic rail according to claim 7, wherein the mass element with the locking element has a geometric design such that in the idle position the mass element with the locking element has a first maximum extent in a direction perpendicular to the extending direction and in the triggering position the mass element with the locking element has a second maximum extent in the direction perpendicular to the extending direction, wherein the first maximum extent in the direction perpendicular to the extending direction is smaller than the second maximum extent in the direction perpendicular to the extending direction and wherein the first maximum extent and the second maximum extent are measured between a plane spanned by the extending direction and the axis of rotation and an edge of the mass element.

9. The telescopic rail according to claim 8, wherein the mass element with the locking element is substantially triangular.

10. The telescopic rail according to claim 7, wherein a second rotary stop is provided on the second rail, wherein the mass element in the triggering position engages with the second rotary stop.

11. The telescopic rail according to claim 1, wherein
the mass element and the locking element are formed in two parts, wherein the mass element is designed such that it is movable against the spring force from the idle position into the triggering position,
wherein in the idle position a section of the mass element prevents the locking element from moving from the unlocked position into the locking position and
wherein in the triggering position the locking element is movable from the unlocked position into the locking position.

12. The telescopic rail according to claim 11, wherein the locking element is held on the second rail so as to be pivotable about an axis of rotation, with the result that the locking element is pivotable from the unlocked position into the locking position.

13. The telescopic rail according to claim 12, wherein the mass element has a lead-in bevel, wherein the mass element and the locking element are arranged such that, in the case of a movement of the mass element from the idle position into the triggering position, the lead-in bevel engages with the locking element and pivots the latter from the unlocked position into the locking position.

14. An article with the telescopic rail according to claim 1, wherein an element which is movable in relation to the article with the aid of the telescopic rail is installed on the telescopic rail.

15. The article according to claim 14, wherein the second rail is secured to the article.

* * * * *